US012617612B2

(12) United States Patent
Verma et al.

(10) Patent No.: US 12,617,612 B2
(45) Date of Patent: May 5, 2026

(54) MOBILE CART FOR STORAGE AND RETRIEVAL OF PAYLOADS WITHIN A WAREHOUSE

(71) Applicant: FALCON AUTOTECH PRIVATE LIMITED, Delhi (IN)

(72) Inventors: Dheeraj Verma, Noida (IN); Manuj Bansal, Delhi (IN); Naman Jain, Delhi (IN); Tuhinanshu Tuhinanshu, Delhi (IN)

(73) Assignee: FALCON AUTOTECH PRIVATE LIMITED, Delhi (IN)

( * ) Notice: Subject to any disclaimer, the term of this patent is extended or adjusted under 35 U.S.C. 154(b) by 466 days.

(21) Appl. No.: 18/140,649

(22) Filed: Apr. 28, 2023

(65) Prior Publication Data

US 2023/0264895 A1 Aug. 24, 2023

Related U.S. Application Data

(63) Continuation-in-part of application No. PCT/IN2021/050079, filed on Jan. 25, 2021.

(51) Int. Cl.
B65G 1/04 (2006.01)

(52) U.S. Cl.
CPC .................................. B65G 1/0492 (2013.01)

(58) Field of Classification Search
CPC .................................................... B65G 1/0492
See application file for complete search history.

(56) References Cited

U.S. PATENT DOCUMENTS

| | | | | |
|---|---|---|---|---|
| 10,000,338 B2* | 6/2018 | Lert, Jr. | ................. | B65G 1/065 |
| 10,913,641 B2* | 2/2021 | Gravelle | ................. | B66F 9/122 |
| 10,919,701 B2* | 2/2021 | Lert, Jr. | .............. | B65G 1/0492 |
| 11,203,486 B2* | 12/2021 | Lert, Jr. | .............. | B65G 1/0435 |
| 11,254,503 B2* | 2/2022 | Mathi | .................. | B65G 1/0421 |
| 11,537,976 B2* | 12/2022 | Gravelle | ................. | H04W 4/40 |
| 11,608,227 B2* | 3/2023 | Cohen | ................ | G05B 19/4155 |
| 11,628,556 B2* | 4/2023 | Balasubramanian | .... | B65G 1/04 |
| | | | | 700/245 |
| 11,866,256 B2* | 1/2024 | Fosnight | ............. | F16H 57/0031 |
| 11,932,129 B2* | 3/2024 | Kalouche | ............. | B65G 1/0464 |
| 12,252,341 B2* | 3/2025 | Liu | ....................... | B65G 1/0492 |

(Continued)

FOREIGN PATENT DOCUMENTS

| | | |
|---|---|---|
| WO | 2020020177 A1 | 1/2020 |
| WO | 2020156025 A1 | 8/2020 |

*Primary Examiner* — Kyle O Logan
(74) *Attorney, Agent, or Firm* — Jose Cherson Weissbrot

(57) ABSTRACT

The present invention relates to a material handling system using mobile cart which provides efficient storage and retrieval of payloads in a three-dimensional warehousing system and on multiple levels. In one embodiment, the mobile cart including a first frame comprising of eight wheels, the primary four wheels of the first frame are configured to move mobile cart in the 'X' direction motion, and the secondary wheels of the first frame which are pinion inbuilt wheels configured to move mobile cart in the 'Z' direction motion. Further, the mobile cart includes a second frame which is moveably attached to the first frame, the second frame including a gear motor, drive pulley, drive belt, four lead screw units, a plurality of sensors and tertiary four wheels, the tertiary four wheels are configured to move mobile cart in the 'Y' direction motion.

7 Claims, 6 Drawing Sheets

(56) References Cited

U.S. PATENT DOCUMENTS

| | | | | |
|---|---|---|---|---|
| 2017/0313514 A1* | 11/2017 | Lert, Jr. | ............... | B65G 1/0492 |
| 2021/0237971 A1* | 8/2021 | Zhang | ................. | B65G 1/0428 |
| 2022/0126626 A1* | 4/2022 | Zhang | ................. | B65G 1/0492 |

* cited by examiner

MOBILE CART FOR STORAGE AND RETRIEVAL OF PAYLOADS WITHIN A WAREHOUSE

FIELD OF THE INVENTION

The present invention relates to a mobile cart and, more particularly, to a mobile cart system controlled and managed by computer sub-systems for controlling guidance to storage and retrieval of payload from one or more storage locations.

BACKGROUND OF THE INVENTION

In the field of material handling, most commonly in a warehouse environment, many articles must be stored in inventory and, an indefinite time later, retrieved for use. The larger the warehouse facility, the greater the number of objects that can be stored. Moreover, large warehouse facilities require a great amount of geographical space. Not only are modern warehouses spread over a great amount of distance, but their height allows many objects to be stacked for storage one above the other. Each object location or bin can be identified along three axes: X, Y and Z. Thus, a warehouse location for any specified particular object can be uniquely identified.

Most warehouses only utilize a fraction of their available vertical space due to many factors, including the limited range to access items stored at higher levels. Three-dimensional rack systems in the form of Automated Storage and Retrieval Systems (often referred to as ASRS or AS/RS) have been proposed that store items on vertical storage racks. However, these vertical systems have several significant commercial drawbacks. Traditional ASRS systems had one gantry robot moving in a long aisle for storage/retrieval operations. The movement speeds were usually good, but limitation was that only one item at a time could be either stored or retrieved from the aisle. No parallel processing was possible. Next generation ASRS systems had mobile robots moving in X-Y plane(s) that solved the parallel processing problem. But the problem was solved only for one particular X-Y plane. The robots could not move vertically to cover the Z axis. There were some solutions which involved the use of lifts at strategic locations to enable robots to travel the Z direction. But those lifts resulted in bottlenecks where robots had to be queued for getting to a different Z level.

Automated Guided Vehicles (AGVs) are typically used in warehousing to automatically perform various material handling functions with no or little human involvement. AGVs are commonly used to improve safety and reduce overhead by limiting the number of employees required to complete specific material handling tasks. Moreover, AGVs can be relied upon to operate continuously 24 hours per day. This advantage of performance over human labourers results in greater efficiency for warehouse facilities. The conventional AVGs are very much limited in the direction of movement, some are restricted their movement over the horizontal axis/plane and some AVGs are restricted over the vertical axis/plane.

Even though prior teaching suggests about the movement on 'X-Y' and 'Y-Z' axes but their overall construction along with the rack system are very much complex or cumbersome in their operations. While advances have been made in such automated goods to delivery systems, there is still a need for automated AVGs which are less complex in constructional aspects and their operations to boost scalability and speed of deploying large systems.

Also, there is a need in the art which increases efficiencies in utilisation of limited warehouse space and available energy.

SUMMARY OF THE INVENTION

The invention has been devised in view of the above-described limitations, and an objective of the invention is to provide an automated three axis mobile cart which can move in all the three dimensions to make the maximum use of storage space by efficiently storage and retrieval of payloads.

In one aspect of the present invention is a mobile cart for storage and retrieval of payload between at least two pickup and delivery stands within a warehouse-type facility. In one embodiment, it includes a first frame including a drive system, a control system, and a payload area. The first frame comprising of eight wheels, the primary four wheels of the first frame are configured to move the mobile cart in the 'X' direction. The secondary wheels of the first frame which are pinion inbuilt wheels configured to move the mobile cart in the 'Z' direction. Further, includes a second frame which is moveably attached to the first frame, the second frame including a gear motor, drive pulley, drive belt, four lead screw units, a plurality of sensors and tertiary four wheels, the tertiary four wheels are configured to move the mobile cart in the 'Y' direction motion. The mobile cart achieves three-dimensional motion during operation by a wheel changing mechanism for shifting 'X' to 'Y' direction, 'Y' to 'Z' direction & 'X' to 'Z' direction & vice versa.

As should be appreciated, the system, device and techniques described and illustrated herein can be utilized in numerous situations and environments including, but not limited to, warehousing, manufacturing, distribution, retail, and the like. Further forms, objects, features, aspects, benefits, advantages, and embodiments of the present invention will become apparent from a detailed description and drawings provided herewith.

BRIEF DESCRIPTION OF THE DRAWINGS

The present invention will become more fully understood from the detailed description given here below, the appended claims, and the accompanying drawings in which:

Figure 1A:
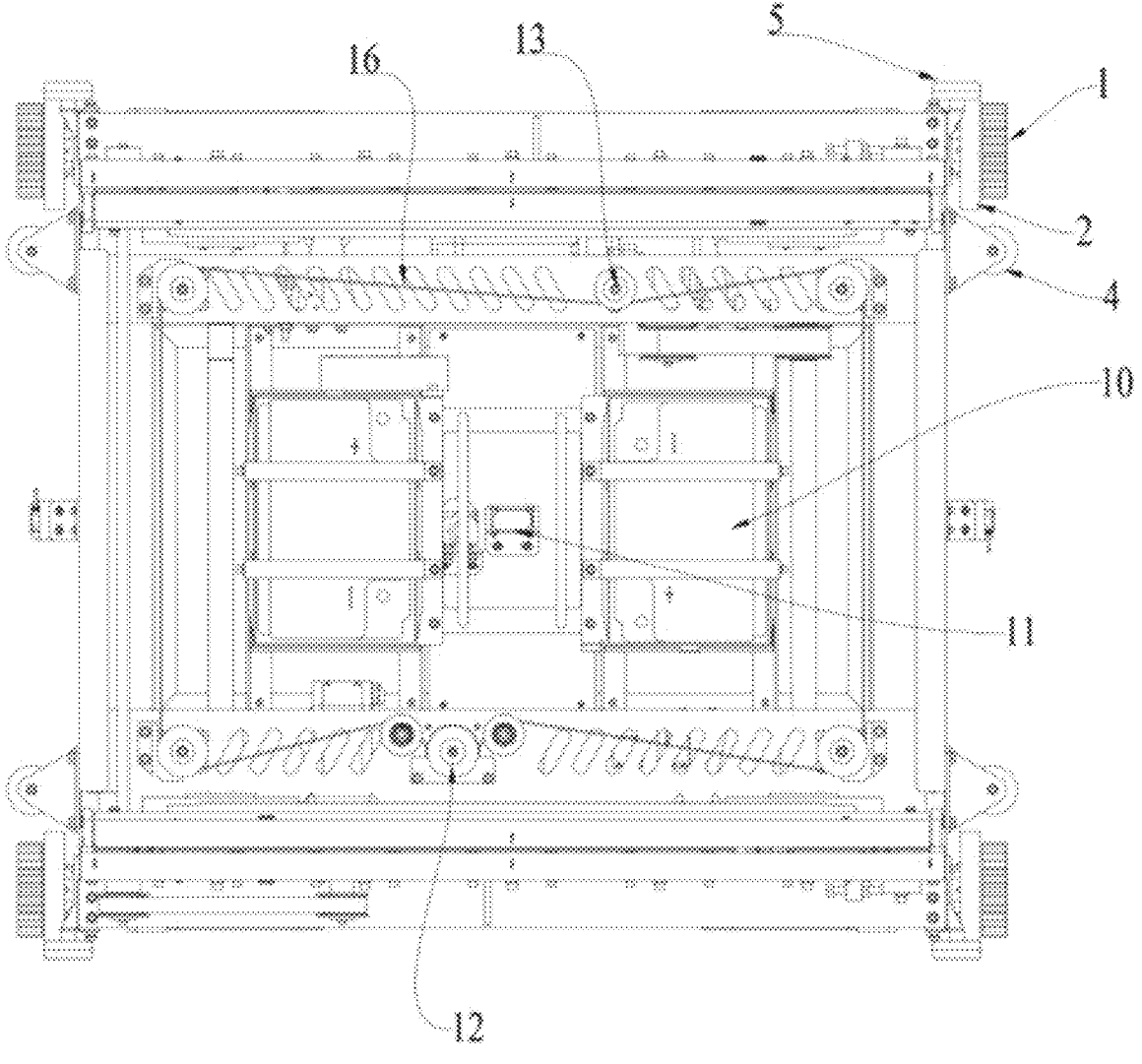
FIG. 1(a) shows a top view of a mobile cart including first frame and second frame in position which facilitates in storage and retrieval of payload within a warehouse-type facility, according to one embodiment of the present invention.

Persons skilled in the art will appreciate that elements in the figures are illustrated for simplicity and clarity and may have not been drawn to scale. For example; the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAILED DESCRIPTION OF THE PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The mobile cart system described below may include any type of automated guided vehicle including but not limited to shuttle, powered trolley, etc. The mobile cart is typically an unmanned and self-propelled vehicle that travels around a guided path or route of a factory, warehouse, distribution center, graded earth, etc. Some examples of potential mobile cart applications include handling materials, delivering parts in a warehouse, and advancing a workpiece or assembly, such as a vehicle chassis, through various stages of a manufacturing process, to cite a few. As will be further described herein, mobile carts can also be used to guide manufacturing equipment to stationary workpieces to perform manufacturing processes thereon. Skilled artisans will appreciate that there are a number of different types of mobile carts, including those that use optical sensors, magnetic sensors, electric field sensors, global positioning system (GPS) sensors, inertial guidance means, laser guidance, and human control via a joystick or other control device to navigate the mobile cart along a desired path, to name a few examples. The mobile cart system described below is not limited to any particular type of mobile cart and may be used with any of the previously mentioned examples, as well as any other type of mobile cart known in the art.

Figure 1B:
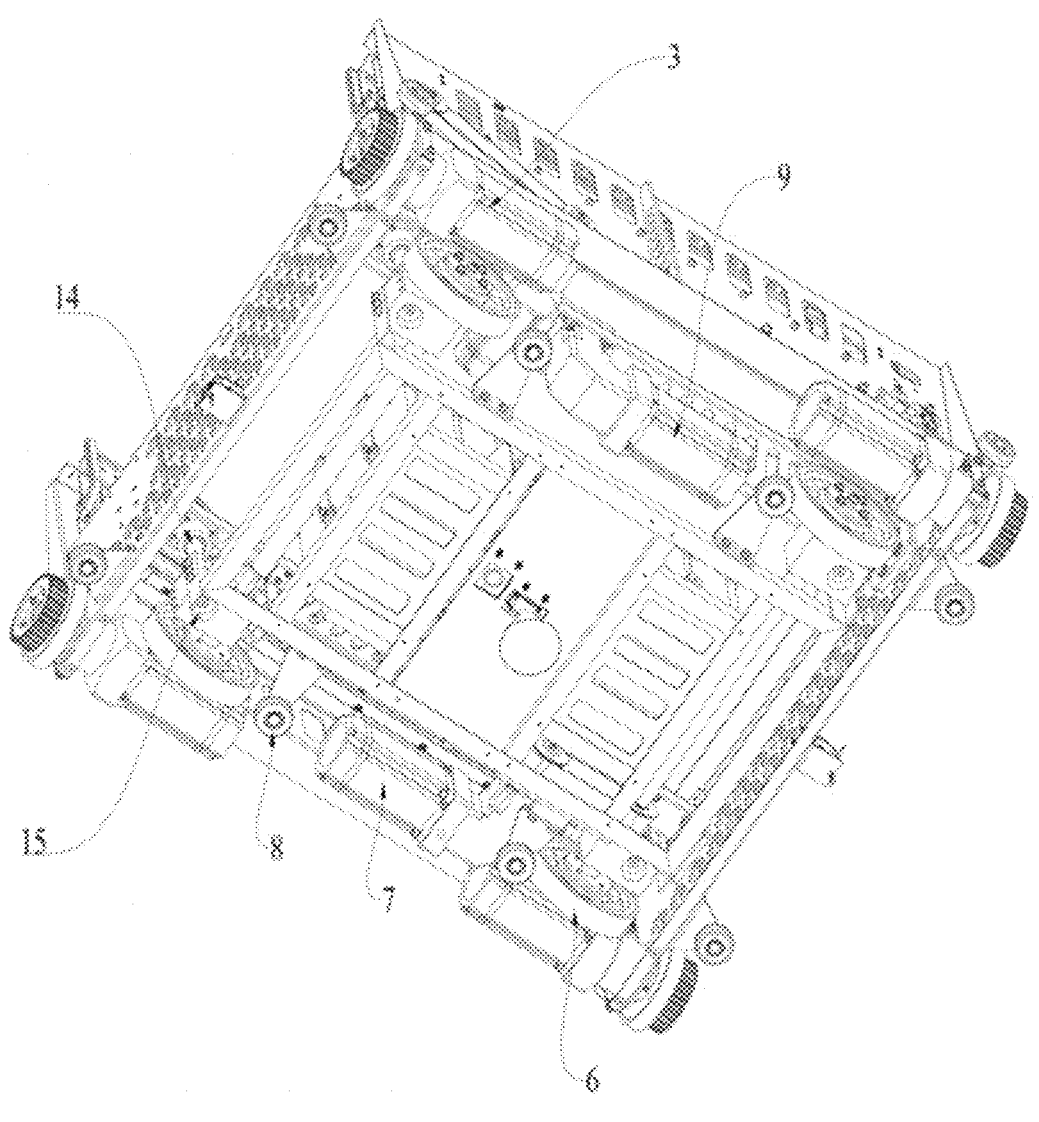
FIG. 1(b) shows a bottom view of a mobile cart including first frame and second frame in position which facilitates in storage and retrieval of payload within a warehouse-type facility, according to one embodiment of the present invention.

FIG. 1(a) & FIG. 1(b) shows an exemplary mobile cart which includes a frame, a payload area or a platform, a pair of drive mechanisms and wheels. Of course, mobile cart may also include other components—like sensors, electronic control units, battery packs, battery charging equipment, docking systems, part lifting mechanisms, etc. These other components can be constructed and assembled in ways known to those skilled in the art and are therefore not described further in detail. Frame acts as a chassis or structural framework for mobile cart and may be constructed according to any number of different arrangements and from a variety of materials. Payload area or Platform is securely fixed to frame and is preferably designed to carry whatever load the mobile cart is designed to transport. In some cases, the mobile cart may be expected to transport objects or assemblies (e.g., materials, parcels, etc.); in such a case the frame and/or the platform may need to be reinforced. As the name suggests, drive mechanisms generally drive or propel the mobile cart as it makes its way along the guided path. It is possible for drive mechanism to drive the mobile cart or to perform some other combinations of tasks. The mobile cart has a power supply which is made up of lithium ion battery. Other possible power supply may be but not limited to bus bars, capacitors, contactless power transmission etc. The mobile cart uses Light Detection and Ranging (LIDAR) sensor for detection one or more of the obstacles along the path. Other sensors for obstacle detection may be Ultrasonic Sensors, IR based Proximity Sensors, Laser Sensors, Vision Based Sensors.

A more detailed explanation of the drive mechanism will be provided below, but it should be appreciated that the number and position of drive mechanisms on the mobile cart may vary according to the particular needs of the application. For example, exemplary mobile cart includes a plurality of drive mechanism with the help of a gear motors. In this particular embodiment, both the front and rear drive mechanisms are located on the first frame of the mobile cart, but other position of the drive mechanism is also possible. The wheels of the mobile cart may be casters or any other suitable type of rotary object and can assist mobile cart with smooth movement along the guided path.

In an embodiment of the present invention, the mobile is for storing and retrieval of payload between at least two pickup and delivery stands within a warehouse-type facility. The mobile cart includes a first frame and a second frame which are superimposed to one another and together forming a frame structure. In one embodiment, the first frame acts as a housing to the second frame. The first frame includes a drive system, a control system, and a payload area. The drive system generally drives, moves, or propels the mobile cart as it makes its way along the ground or other surface. Drive system may be attached to the frame, and the number and position of drive system may vary according to the particular needs of the application. For example, exemplary mobile cart may include a first drive system toward a front of the mobile cart and a second drive system toward the rear, but this is not necessary, and as few as one drive system may be included to propel the mobile cart. The exact number, location and arrangement of the drive system may be dictated by the nature of the payload that the mobile cart is expected to transport, as well as the manoeuvres or turns that the mobile cart must make in order to follow the intended route or guided path. The first frame comprising of four wheels, the primary four wheels of the first frame are configured to move mobile cart in the 'X' direction motion, and the secondary wheels of the first frame which are pinion inbuilt wheels configured to move mobile cart in the 'Z' direction motion. The second frame which is moveably attached to the first frame, the second frame including a gear motor, drive pulley, drive belt, four lead screw units, a plurality of sensors and tertiary four wheels, the tertiary four wheels are configured to move mobile cart in the 'Y' direction motion. In an embodiment, the mobile cart is capable of changing the axis using the lead screw mechanism (i.e. the X-Y axis change and X/Y-Z axis change). The relative movement of frames enable the mobile cart for XYZ axis changes. Due to this mobility, the mobile cart can independently travel in the Z direction from any point in the storage structure, which eliminates the need and bottleneck of lifts.

The first frame covering the payload area has retractable means for storage and retrieval of the payload, the retractable means includes a plurality of casing with a finger. In an example embodiment, the retractable means includes telescopic arms and the functionality of the fingers (i.e. rotatable) for pushing/pulling the payload from the to/from the payload area. Other mechanism for storage and retrieval may be under-sliding forks, chain and finger-based mechanism, gripper mechanism etc.

In one embodiment, mobile cart using the primary four wheels attached will assist in moving the vehicle horizontally, and the secondary four wheels attached will assist the vehicle in moving vertically. In this embodiment, primary/secondary/tertiary wheels selectively engage and disengage with the track depending upon the relative frame position. Due to this, the mobile cartwheels are always equipped for movement in any direction one wants to move. The axis change mechanism of the mobile cart is solely responsible for either engaging the primary wheels with X axis or the secondary wheels with Z axis or the tertiary wheels with Y axis. In one embodiment, the relative frame position detection is by IR based proximity sensors. The other sensors may be limit switches, laser sensors, ultrasonic sensors etc. In order to guide across the track, the mobile cart uses a vision-based barcode reader. The other positioning system includes Laser based barcode reader, magnetic tape, LIDAR based navigation, Vision based navigation, Laser guided navigation, Inductive wire-based navigation.

Figure 2A:
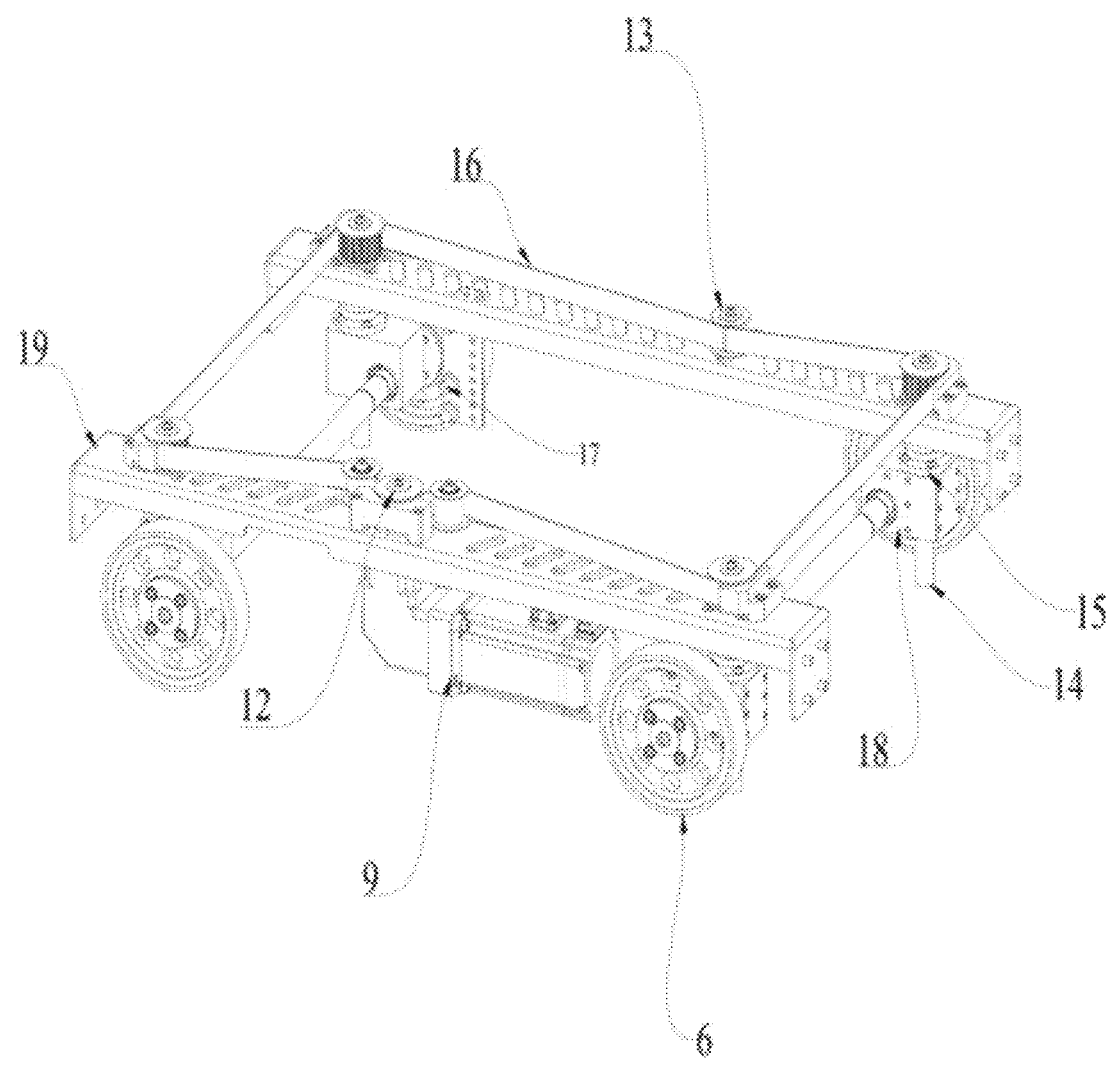
FIG. 2(a) shows a second frame detached from first frame of the mobile cart according to one embodiment of the present invention.

FIG. 2(a) shows a second frame detached from first frame of a mobile cart according to one embodiment of the present invention. In an embodiment of the present invention, the second frame which is moveably attached to the first frame, the second frame including a gear motor, drive pulley for lifting, drive belt, four lead screw units, a plurality of sensors and tertiary four wheels, the tertiary four wheels are configured to move mobile cart in the 'Y' direction motion. In an example embodiment, the second frame acts as a support structure for the first frame. The wheel changing mechanism of the mobile cart achieves three-dimensional motion during operation. The mechanism is used for both shifting 'X' to 'Y' direction motion, 'Y' to 'Z' direction motion & 'X' to 'Z' direction motion & vice versa. Majorly, the wheel changing mechanism includes a gear motor, a drive pulley, a drive belt, four lead screw units and proximity sensors (17) which are attached for lifting location confirmation. During change in direction motion of mobile cart, the tertiary four wheels are either raised or lowered using the gear motor which rotates the wheels in clockwise or anti-clockwise direction.

The sensors used in the mobile cart may include one or more sensors electronically coupled to the control unit or units to provide or collect information regarding the position, alignment, and/or orientation of the mobile cart. The sensors may of course be of any other variety known in the art and may alternatively or additionally be included or used as part of a locating mechanism. In an example embodiment, the sensors are a plurality of LIDAR sensors offering 360-degree protection from obstacles. Other examples of sensors may include but not limited to Infrared, Ultrasonic, Vision and Laser based sensors.

Figure 2B:
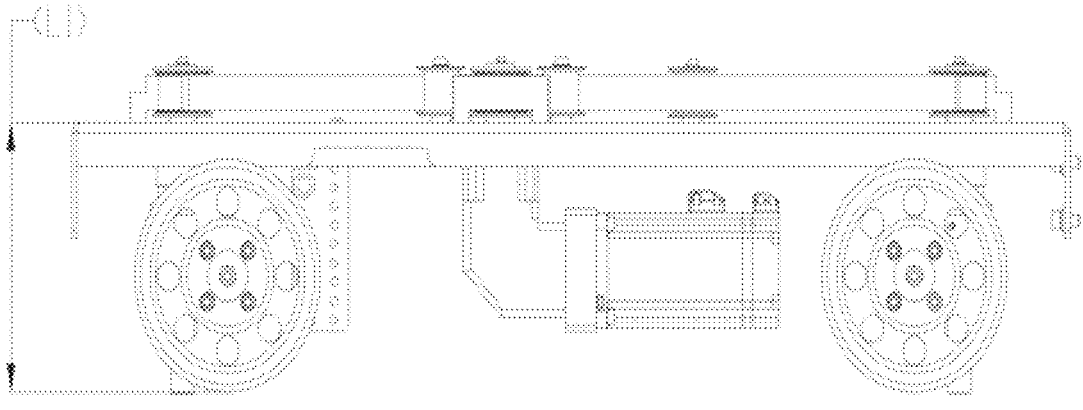
FIG. 2(b) show the elevation mechanism of the second frame according to one example embodiment of the present invention.
Figure 2C:
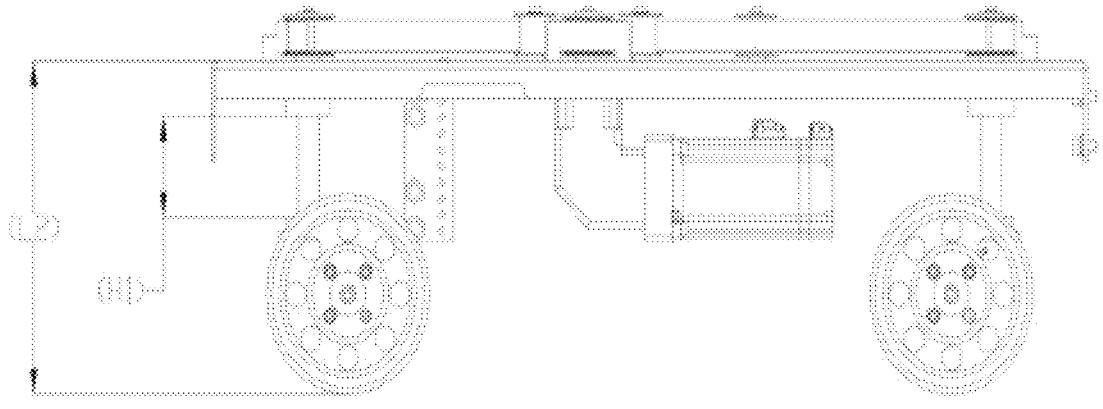
FIG. 2(c) show the elevation mechanism of the second frame according to another example embodiment of the present invention.

Further, the lead screw can be any of several types known in the art that convert rotational motion to linear motion or translation. Lead screws perform the function by rotating a threaded rod within an internally threaded nut, where the nut is affixed to the component that is to be moved up and down. The nut moves along the threaded rod as the threaded rod rotates. The lead screw may be a ball screw, as is known in the art, wherein the nut is a ball assembly which moves and recirculates load-bearing balls along the threads of the threaded rod to enable translation in a lower friction and more precise manner. Further, FIG. 2(b) and FIG. 2(c) shows the elevation or lifting mechanism using gear motor of the second frame according to one example embodiment of the present invention.

Figure 3:
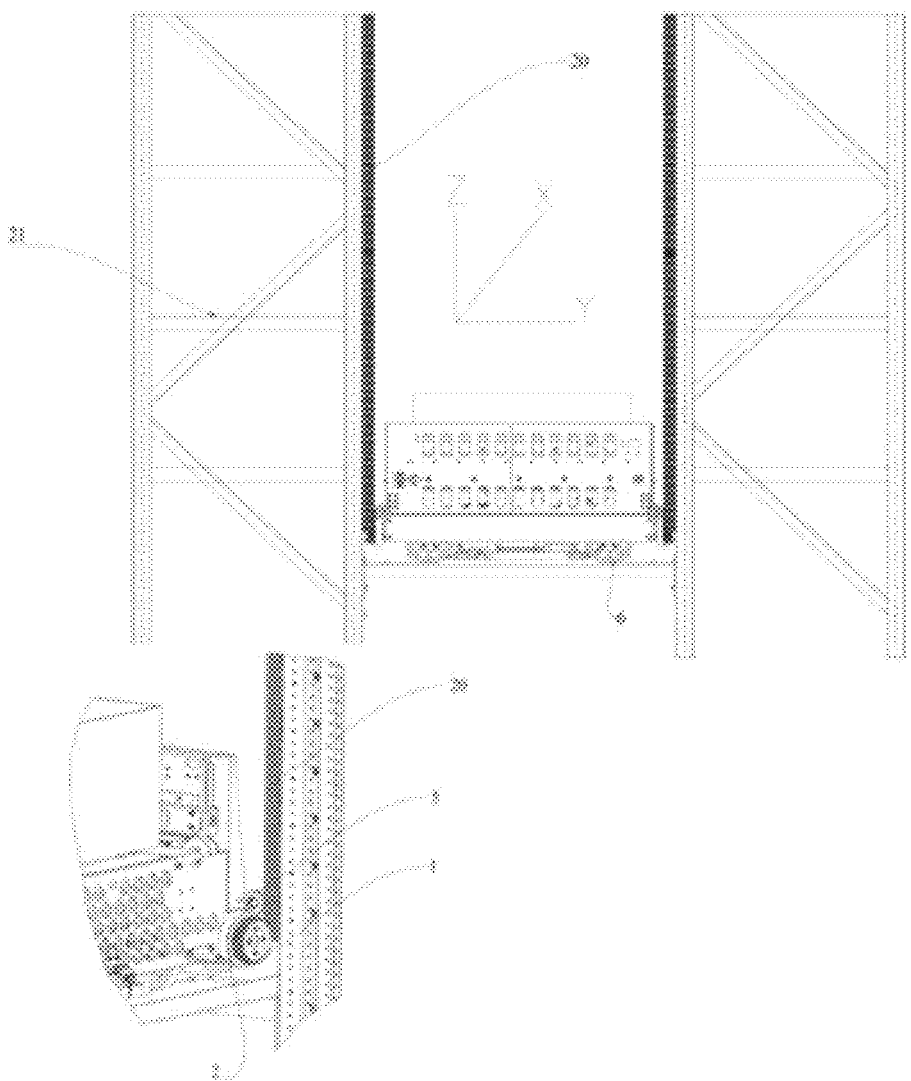
FIG. 3 shows the operation of the mobile cart in a multi-level storage structure of a warehouse-type facility, according to one embodiment of the present invention.

Referring to FIGS. 3, there is shown a part of warehouse system, generally indicated at 21, further defines a multi-level grid of paths and a mobile cart, also may be referred as carts or shuttles, which are controlled to move throughout the grid. A rack structure 21 includes a plurality of spaced apart rails extending in all directions which collectively define a plurality of paths along which mobile cart may travel. As described below, a plurality of direction paths run under storage areas where payloads or materials are stored. Warehouse system includes a plurality of payload storage levels and may include a plurality of cart storage levels, where carts may be stored. The rack structure also includes assembly which is configured to move carts between the various levels, with or without payloads. Thus, rack structure defines paths for carts to travel long between locations on different levels. Although the embodiment illustrated is limited in size, with only few levels, and storage areas, the warehouse system may have any suitable number of levels, storage areas and x, y and z direction paths. As shown in FIG. 3, the mobile cart using the secondary wheels moves in a vertical direction. The secondary wheels which are pinion inbuilt wheels configured to move mobile cart in the 'Z' direction motion.

The warehouse system may include a controller which executes software instructions to implement the control logic which operates the system. Controller may be programmed to control movements of carts, or carts may include a processing system which receives instructions from controller and executes software instructions to control its movement and operation. Carts may locate themselves in any suitable way, such as through a local positioning system, through location markers in the system, or distance and direction tracking. Controller may communicate with carts directly or indirectly, and with other processing systems of warehouse system in any suitable manner, such as by wireless communication, wired, or IR.

It is to be understood that the foregoing description is of one or more preferred exemplary embodiments of the invention. The invention is not limited to the particular embodiment(s) disclosed herein, but rather is defined solely by the claims below.

Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

REFERENCE NUMERALS

| List of Reference Numerals | |
| --- | --- |
| 1 | PINION-Z AXIS |
| 2 | WHEEL-X AXIS |
| 3 | GEAR MOTOR-X and Z AXIS |
| 4 | GUIDE WHEEL-X AXIS |
| 5 | GUIDE WHEEL-Z AXIS |
| 6 | WHEEL-Y AXIS |
| 7 | GEAR MOTOR-Y AXIS |
| 8 | GUIDE WHEEL-Y AXIS |
| 9 | GEAR MOTOR-AXIS CHANGE |
| 10 | BATTERY-PACK |
| 11 | BARCODE SCANNER |
| 12 | DRIVE PULLEY-AXIS CHANGE |
| 13 | BELT TIGHTNER PULLEY-AXIS CHANGE |
| 14 | LEAD SCREW |
| 15 | LEAD NUT |
| 16 | DRIVE BELT-LEAD SCREW |
| 17 | PROXIMITY SENSOR |
| 18 | MOUNTING BLOCK |
| 19 | FIXED FRAME |
| 20 | RACK GEAR |
| 21 | STORAGE RACK STRUCTURE |

The invention claimed is:

1. A mobile cart for storing and retrieval of payloads between at least two pickup and delivery stands within a warehouse-type facility, comprising:

a first frame including a drive system, a control system, and a payload area, the first frame comprising of four wheels, the primary four wheels of the first frame are configured to move the mobile cart in the 'X' direction motion, and the secondary wheels of the first frame which are pinion inbuilt wheels configured to move the mobile cart in the 'Z' direction motion; and a second frame which is moveably attached to the first frame, the second frame including a gear motor, drive pulley, drive belt, four lead screw units, a plurality of sensors, and tertiary four wheels, wherein the tertiary four wheels are configured to move the mobile cart in the 'Y' direction motion and the second frame is vertically moveable relative to the first frame via the four lead screw units;

wherein relative movement of the first frame and the second frame enable the mobile cart for XYZ axis changes, wherein depending upon a relative frame position, one of the primary wheels, the secondary wheels, or the tertiary wheels selectively engage or disengage with a track of a path along which the mobile cart travels due to which the mobile cart is capable of moving independently in the Z direction from any point in the storage structure.

2. The mobile cart as claimed in claim 1, further including a wheel changing mechanism for achieving three dimensional motion during operation, wherein the mechanism is used for shifting 'X' to 'Y' direction motion, 'Y' to 'Z' direction motion & 'X' to 'Z' direction motion & vice versa.

3. The mobile cart as claimed in claim 2, wherein the wheel changing mechanism includes a gear motor (9), a drive pulley (12), a drive belt (16), four lead screw units (14, 15) and proximity sensor (17).

4. The mobile cart as claimed in claim 1, wherein during change in direction motion, the tertiary four wheels are either raised or lowered using the gear motor (9), which rotates the wheels in clockwise or anti-clockwise direction.

5. The mobile cart as claimed in claim 3, wherein the sensors (17) are attached for lifting location confirmation.

6. The mobile cart as claimed in claim 1, wherein the first frame covering the payload area has retractable means for storage and retrieval of the payload, the retractable means includes a plurality of casing with a finger.

7. The mobile cart as claimed in claim 1, wherein the primary four wheels attached to assist in moving the vehicle horizontally, the secondary four wheels attached to assist the vehicle in moving vertically.

* * * * *